(12) United States Patent
Kespohl

(10) Patent No.: US 7,261,376 B2
(45) Date of Patent: Aug. 28, 2007

(54) CHILD'S CAR SEAT

(75) Inventor: Horst-Günther Kespohl, Weilheim (DE)

(73) Assignee: Recaro GmbH & Co. KG, Kirchheim/Teck (DE)

( * ) Notice: Subject to any disclaimer, the term of this patent is extended or adjusted under 35 U.S.C. 154(b) by 114 days.

(21) Appl. No.: 11/044,960

(22) Filed: Jan. 27, 2005

(65) Prior Publication Data

US 2005/0168025 A1 Aug. 4, 2005

(30) Foreign Application Priority Data

Feb. 4, 2004 (DE) ...................... 10 2004 005 624

(51) Int. Cl.
*A47C 1/11* (2006.01)
*A47C 1/08* (2006.01)
*A47D 1/10* (2006.01)
(52) U.S. Cl. ............................. 297/256.13; 297/250.1
(58) Field of Classification Search ........... 297/256.13, 297/250.1
See application file for complete search history.

(56) References Cited

U.S. PATENT DOCUMENTS

| | | | | |
|---|---|---|---|---|
| 3,572,827 A | * | 3/1971 | Merelis et al. ............... | 297/253 |
| 4,854,639 A | * | 8/1989 | Burleigh et al. .......... | 297/250.1 |
| 5,344,213 A | * | 9/1994 | Koyanagi ............... | 297/256.13 |
| 5,842,740 A | * | 12/1998 | Lefranc ................... | 297/250.1 |
| 6,299,249 B1 | * | 10/2001 | Mori ...................... | 297/256.13 |
| 6,318,799 B1 | * | 11/2001 | Greger et al. .......... | 297/256.13 |
| 6,508,510 B2 | * | 1/2003 | Yamazaki ................ | 297/250.1 |
| 6,672,664 B2 | * | 1/2004 | Yanaka et al. ......... | 297/256.16 |
| 6,705,675 B1 | * | 3/2004 | Eastman et al. ......... | 297/250.1 |
| 6,827,399 B2 | * | 12/2004 | Schoor et al. ........... | 297/250.1 |
| 6,908,151 B2 | * | 6/2005 | Meeker et al. ........... | 297/250.1 |
| 7,059,677 B2 | * | 6/2006 | Balensiefer et al. ... | 297/256.13 |
| 2001/0000638 A1 | * | 5/2001 | Kassai et al. ............ | 297/250.1 |
| 2001/0028186 A1 | * | 10/2001 | Koyanagi et al. ........ | 297/250.1 |
| 2001/0045767 A1 | * | 11/2001 | Burleigh .................. | 297/250.1 |
| 2002/0017808 A1 | * | 2/2002 | Kain ....................... | 297/250.1 |

FOREIGN PATENT DOCUMENTS

DE 91 15 290 3/1992

* cited by examiner

*Primary Examiner*—David R. Dunn
*Assistant Examiner*—Tania Abraham
(74) *Attorney, Agent, or Firm*—Pandiscio & Pandiscio

(57) ABSTRACT

This invention involves a child's car seat with a seat surface, a back rest, optionally with side arm supports and/or head supports or rests, and with side guides for the insertion of the belt of a car, and with at least one device for the automatic tightening of the car belt, and with a device for adjusting the inclination of the child's car seat relative to the vehicle's own seat. The device for the automatic tightening of the car belt is located in the area of a belt provided in the top area of the back rest guide and acts at the same time on the shoulder belt and the waist belt. There is further at least one device for fastening the car's shoulder belt immovably with respect to the child's car seat.

9 Claims, 2 Drawing Sheets

CHILD'S CAR SEAT

BACKGROUND OF THE INVENTION

1. Field of the Invention

This invention relates to a child's car seat with a seat surface, back rest, optionally with arm rests on the side, and/or head rest, with lateral guides for inserting a car seat belt, and with at least one device for automatically tightening the car seat belt, and with a device for adjusting the inclination of the child's car seat relative to the vehicle's seat.

2. Description of the Prior Art

Depending on their age and size, children in children's car seats are belted in either with a belt of the seat itself or with a three-point car seat belt. If the children are fastened in with the seat's own belt, the car seat belt is often used to fasten the child's seat itself. Such a car seat belt is frequently connected or clamped to the child's seat at least one point so that the child's seat is anchored as well as possible despite the vehicle's own usual automatic rollup mechanism.

In any case it is important for all of the belts involved always to be pulled tight so that the buckled-in child is held securely in place in case the vehicle suddenly slows down, especially in case of an accident.

On the other hand, however, it is desirable also to offer a child a more sharply inclined relaxed position besides the vertical sitting position—especially for long vacation trips. However, this is impossible in case of an internal connection of the child seat in question with a tightly clamped vehicle belt.

A system of this type is disclosed by German Utility Patent G 91 15 290.0. Of course, in this case the rear of the seat back is has a convex arch longitudinally, so that when the inclination of the seat is adjusted, different areas of the back rest are against the car's seat, but not other areas. For example, if the lower back of the child's seat in the upright position rests against the car's seat, then in the sloping position it is the upper back, while the lower back area is displaced far forward, and can give the seat no support. If the car belt in this condition is not tightly fastened, for example because the child has played with the belt, then the seat can tip forward in case of a sudden slowdown and then completely loses contact with the vehicle's seat back. The result is completely uncontrolled motion, and the child's seat and the child sitting in it become like a plaything with high inertia and the life and limb of the child are in danger.

The problem inspiring the invention results from these drawbacks of the described state of the art, to develop a device that indeed allows adjustment of the child's seat with regard to its inclination, but nevertheless always provides optimal support of the child's seat on the vehicle's own seat.

SUMMARY OF THE INVENTION

This problem is solved by at least one device for the automatic tightening of the car's seat belt being placed in the area of a belt guide and acting on the shoulder belt and waist belt at the same time, with at least one device for fastening the car's shoulder belt immovably relative to the child's car seat being provided in the upper area of the back rest, especially by solid clamping of the car's shoulder belt.

The invention chooses these areas for influencing a car's own belt, because the course of the belt here is given, independently of the design of the vehicle and of the belt, and independently of the size of the child, and is therefore always known. Particularly suitable are the belt guides for the length of a three-point belt that runs over the pelvis, because this ordinarily runs roughly symmetrically to the middle of the child's seat, so that all belt-tightening devices provided at these points are active and their actions can be additive. Also, at least on one side of the seat, tightening here can be done at the same time on the shoulder belt because of its course in great proximity, so that on the one hand the length-compensation capability for the belt provided by the belt-tightening mechanism is tripled overall and therefore further improved. This becomes possible only by fastening or clamping the shoulder belt to the child's seat in the shoulder area, since in this case the stress of the vehicle's automatic rollup mechanism acting on the shoulder belt is no longer effective beyond such a clamping mechanism and therefore can no longer contribute to belt-tightening in this area beyond the clamp; this task then has to be accomplished entirely by the belt-tightening device of the child's seat itself. On the other hand, the child's seat in such a case can move relative to the car's seat, especially in the lower back area, while its upper back edge remains always in contact with the car's seat because of a largely flat back face of the child's seat back rest. For this reason, the vehicle's own automatic belt rollup mechanism always remains in an unchanged tightened state and is therefore ready at all times for an emergency, to protect the child's seat against unwanted motions relative to the vehicle's seat.

A vehicle's own belt can also be tightened by a device for adjusting the inclination of the child's car seat relative to a vehicle's seat, since in such a case the course of the belt is also affected, especially when the belt guide devices are also displaced relative to the belt anchoring to the vehicle during adjustment of the inclination of the seat.

It has proved to be desirable for the device for belt-tightening to have an element movable, at least in some areas, relative to the seat back and/or face. Because of this mobility, such an element attempts to act on the belt passing by it and to deflect it (further) at this point from its otherwise straight stretched, or at least less deflected, course, so that the needed belt length is increased and the belt is thus tightened.

It is within the scope of the invention for the movable element of the belt-tightening device to be movable approximately perpendicular to the plane of the belt in the area of the belt guide, and especially to be guided there. In this case the invention considers the fact that the belt can indeed also be deflected from its course otherwise within its belt plane; in this case, however, the belt is distorted and folds, so that a non-uniform and therefore undesirable stress profile results within the belt. These drawbacks are avoided if the belt is deflected somewhat perpendicular to its plane, which can occur uniformly over its entire width.

Other advantages are obtained by the movable element of the device for belt tightening being movable approximately in the direction of travel, especially being guided in that direction. The fact is taken into consideration than a car's own belt in the buckled condition extends primarily across the direction of travel, and its plane is in that direction.

In further pursuit of the concept of the invention, one or more recesses and/or projections can be provided on the back of the belt-tightening device to tighten the belt, each of which works together with a projection or a recess in the seat or arm rest or in the arm or side support that accepts it. Outside of the belt guides, the course of the belt is affected by various parameters, and it is therefore just as little-known as the force acting on the movable element resulting from the belt tightening. For the element not to be damaged, a defined deflection that is provided by (linear) guidance is important. Naturally, a pivoting motion could also be prescribed by the guidance device. In such a case, the pivot axis should of course be about parallel to the plane of the belt, and furthermore it should preferably be oriented perpendicular to the longitudinal direction of the belt, so that the belt is deflected almost uniformly over its entire width.

This embodiment of the invention is also characterized by one or more spring elements that try to press the movable element of the belt-tightening device toward the car's own belt. Since the movable element can move freely between limiting elements (stops), a force equilibrium with the belt-tightening stress can be produced with the spring elements. To this end, the belt has to be pulled only tight enough that the movable element is deflected against the restoring force of a spring element and the spring involved is stressed.

At least one spring element can consist of a compression spring that is placed between the movable element and the seat rest or arm rest or the arm or side support. To be able to insert a belt in a belt guide without threading it through, the guide must be in the form of a slit. The belt preferably rests against such a slit at one edge area, particularly on the rear one as viewed in the direction of travel. By at least one (integrated) spring element pressing this (rear) edge area of the belt guide forward, the course of the belt can be lengthened and thus the belt can be tightened. If such a spring element is integrated between this movable edge area and the body of the seat, a space-saving arrangement is produced; the risk of injury is also minimized. The use of compression springs leads to especially simple construction.

In the context of such an arrangement, at least one spring element can be designed as a coil spring that is guided in a recess or by a projection of the movable element of the belt-tightening device or of the seat rest or arm rest or the arm or shoulder support. The desired spring characteristics can be set with coil springs; they are simple, economical, and wear-free.

The invention also provides that at least one element of the belt-tightening device is elastic. This elasticity serves the same purpose as the spring element in the previously described embodiment, namely providing force equilibrium for the stress tightening the belt.

In this case, at least one element of the belt-tightening device should consist of an elastic material with a Shore hardness between 30 and 80, preferably with a Shore hardness of 40 to 70, in particular from 50 to 60. This suggests especially relatively soft materials such as rubber (hard rubber), deformable (soft) plastics, or a foam (hard foam).

If, for example, there are difficulties in realizing suitable elasticity with the material properties alone, at least one element of the belt-tightening device can have cutouts, especially openings and/or cavities. Such cutouts weaken the element in question and thus increase its elasticity. If such openings have a uniform cross section throughout their depth, the resulting spring constant or elasticity constant remains constant within broad limits. On the other hand, if the cross section changes, nonlinear spring or elasticity characteristics are the result.

The mechanism for adjusting the inclination of the child's car seat can be designed so that the inclination of the seat as a whole is adjusted, i.e. with no relative motion of the back rest relative to the seat surface. This permits the seat to be designed as a one-part seat shell that can withstand high loads in case of an accident with no damage.

Preferably, a plate- or framework-shaped component hinged to the bottom or back of the child's seat serves to adjust the inclination of the child's seat. This is connected to the child's seat movable in its bearing points and affects particularly the position of the bottom part of the seat, for example by being pushed to a suitable position relative to the car's seat cushion. For example, the bottom part of the seat can be pushed forward relative to the back rest of the car's seat to increase the inclination; to assist in this, the top edge of the back rest of the child's seat might also be pressed into the upholstery of the vehicle's seat, but never loses contact with the vehicle's seat. This gives this upper seat area a very good hold, especially a lateral hold, including particularly with regard to the not inconsiderable lateral forces when driving around curves.

The inclination of the seat and/or rest surfaces offered to a child relative to an element resting on the vehicle's own seat can be controlled especially sensitively by providing such a device for adjusting the inclination of the child's car seat as a plate- or framework-shaped component on the bottom or back of the seat that can pivot around an axis running perpendicular to the seat direction or the direction of travel. This element resting on the vehicle's seat is supported on the vehicle's seat and presses the seat shell at the place in question to a variable degree away from the vehicle's seat. By displacing the seat shell only a little into its regions more distant from the vehicle's seat, the inclination of the child's seat can be adjusted by adjusting the pivotable component, but without changing its lateral inclination. The child's seat therefore cannot rock even in case of sporty driving around curves.

The pivotable plate- or framework-shaped component is most effective with regard to adjusting the inclination of the child's seat when its areas most distant from the pivot shaft are either in the vicinity of the front edge of the seat surface or in the vicinity of the top edge of the back rest. This is achieved by the pivot shaft of the pivotable component being located about in the area of the transition from the seat surface to the back rest, preferably in the back region of the seat bottom, especially below the back rest.

To simplify construction, the pivot shaft can consist of two lateral shaft stubs on the pivotable component. These can be integrated with the pivotable component, or can be in the form of a single injection-molded plastic part.

The angle of inclination of the pivotable plate- or framework-shaped component relative to the seat bottom is preferably set with a manually operable mechanism.

For example, such a mechanism has at least one cam-like element that is located in the area between the seat and its pivotable element for setting the angle of inclination of the pivotable component. Depending on the rotational position of such a cam, the pivotable component is spread apart from the outer and/or bottom face of the child's seat at the position in question to a variable extent.

For the pivotable component to be able to pivot as completely as possible on the outer and/or bottom face of the seat, at least one cam should be made to pivot in a depression on the outer and/or bottom face of the seat. If the projecting circumferential area of the cam dips into this depression, it barely extends over the seat surface in question and permits a somewhat parallel course between the outer and/or bottom surface in question and the pivotable component. The depression holding the cam could be integrated into an arm rest or head rest of the child's seat, for example.

To prevent torsion on the child's seat and/or on the pivotable element, there should be two cams, which in such a case can be arranged on a common shaft that brings about the simultaneous adjustment of these cams. In any case, including when only a single cam is used, such a shaft supporting the cam(s) can run at least to one side of the child's car seat and could be provided there with a control for adjusting its rotation. Such a control, for example, could be a crank or a handwheel. In the latter case, ratchet elements, for example depressions or projections, can also be provided on the handwheel, particularly on its circumference, by which the rotation can be fixed in given positions when complementary elements of the seat engage in or on them.

The camshaft preferably extends inside a cutaway in the outer or bottom face of the seat; its bearing is then also located there. Such a bearing can be made as a friction bearing, for example as a bore or slot in an element, for example a disk-shaped element on the outer or bottom face of the seat, that tightly surrounds the shaft.

A mechanism for limiting the pivot angle of the pivotable plate-shaped or framework-shaped element assures that this element does not swing around uncontrollably when the child's seat is taken off of a vehicle seat. A practical mechanism of this type for limiting the pivot angle, for example, is a strap or a loop or the like that is fastened or can be fastened on the one hand to the pivotable component and on the other hand to the child's car seat, and whose free length between these fastening points determines the maximum pivot angle.

Finally, it conforms to the teaching of this invention for the mechanism for limiting the pivot angle to be designed as a loop wound around the cam shaft. Such anchoring of the pivotable element on the cam shaft provides the ability to release the entire mechanism for adjusting the inclination from the shell of the seat when needed, for example by taking the cam shaft on the one hand and the pivot shaft (end) on the other hand out of the slot-like bearing beds, for example.

BRIEF DESCRIPTION OF THE DRAWINGS

Other features, characteristics, advantages, and effects of the invention can be found in the following description of preferred embodiments of the invention and with reference to the drawings. The drawings show:

FIG. 5 the area of a back belt guide of the child's seat from FIG. 1 in a cross section parallel to the arm rest in question;

FIG. 6 a modified embodiment of the invention in a representation corresponding to FIG. 5.

Figure 1:
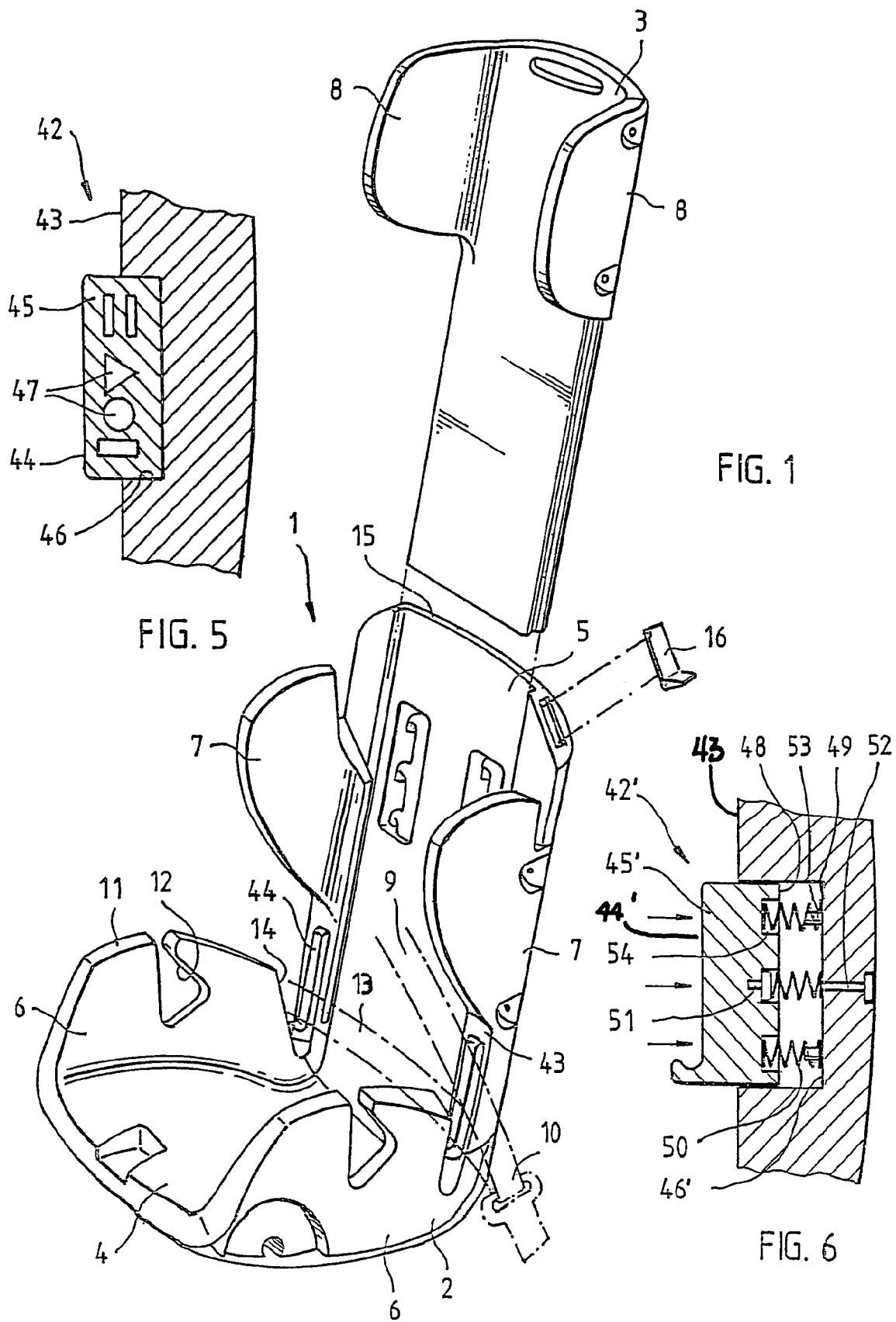
FIG. 1 a child's car seat pursuant to the invention in perspective representation.

The child's seat 1 in FIG. 1 consists of an intrinsically rigid seat shell 2 and a head rest 3 vertically adjustable on it. The seat shell 2 comprises the actual seat surface 4, the back rest 5, two arm rests 6, and two arm or shoulder supports 7. The two arm or shoulder supports 7 have about the same mutual separation as the two arm rests 6. The separation of side parts 8 of the head support 3, on the other hand, is smaller, so that the head support 3 with its side parts 8—guided on the back rest 5—can be pushed far down, whereby the head support side parts 8 arrive between the arm or shoulder supports 7 so that an open space always remains between them for a shoulder belt 9 of a vehicle's own belt 10.

In this position of the head rest 3 pushed downward to the maximum, the child's seat 1 is suitable for small children less than about 3 years old. Since the vehicle's own belt 10 is not suitable for them, there is a belt of the child's seat 1 itself, preferably like suspenders. This is not intended to be primarily an object of the present invention.

The vehicle's own belt 10 is always used, both for children less than about 3 years old and for older children. For belting in the latter, there are guide depressions 12 in the two arm rests 6 open toward their tops 11 for insertion of the waist part 13 of the vehicle's own belt 10. These depressions 12 are located about in the middle of the arm rests 6 viewed in the longitudinal direction.

In the case of children younger than about 3 years old, on the other hand, the vehicle's belt 10 is used only to fasten the child's seat 1 to a vehicle's seat. For this purpose, there is another slot-shaped depression 14 open at the top, on the back end of each arm rest 6, close to or directly in front of the back rest 5. If the waist part 13 of the vehicle's belt 10 is inserted here, it grips only around the back rest 5, while the child sits in front of the belt 10. In this case, to fasten the child's seat 1 to the belt 10, a clamp 16 can be provided in the area of the top edge 15 of the back rest 5, roughly above an arm or shoulder support 7, to clamp down the shoulder belt 9. This can be a shackle, attached like a hinge at one end, that is provided with a hook or the like at its free end, for example.

Figure 2:
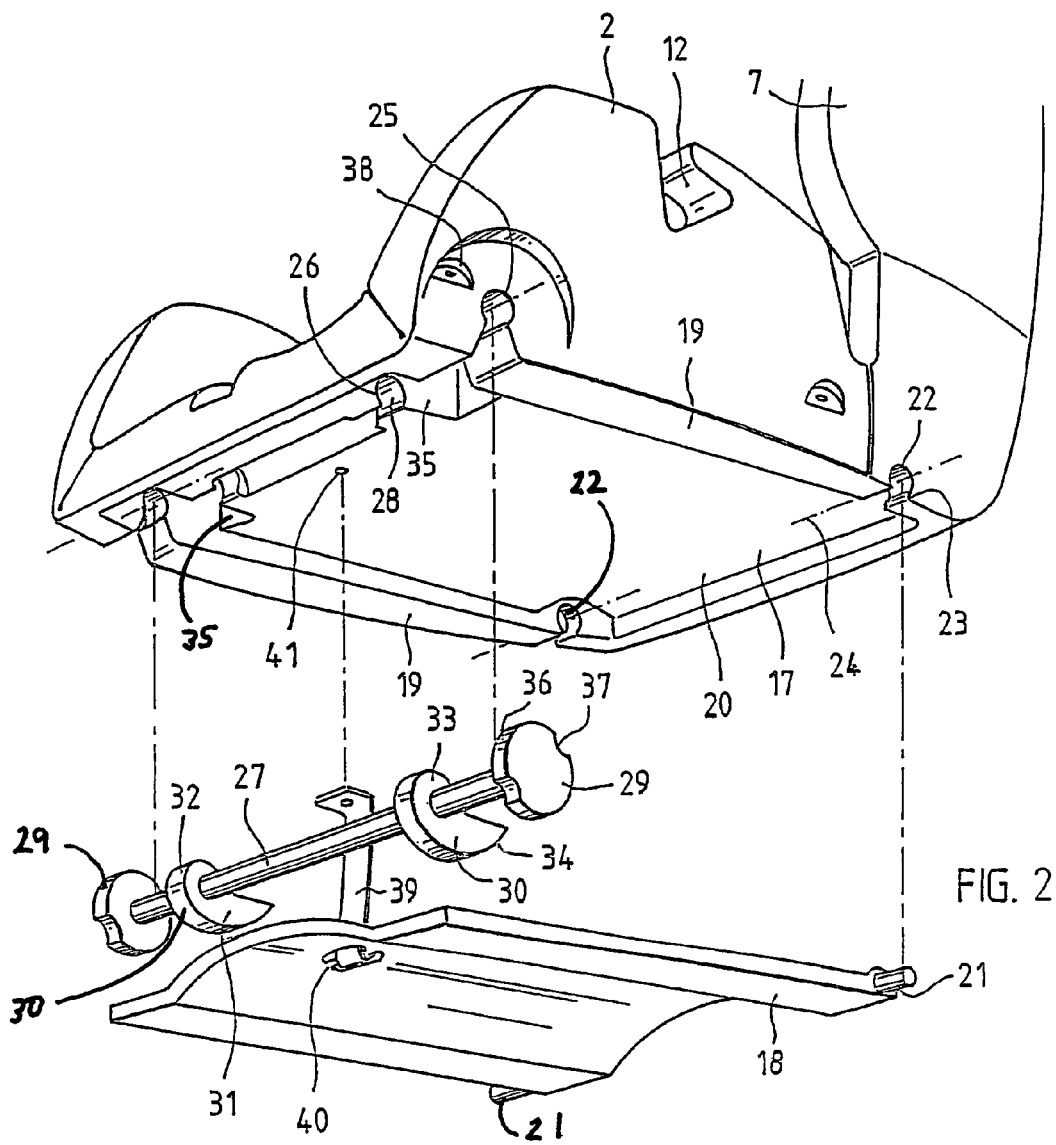
FIG. 2 an exploded representation of the bottom part of the child's seat of FIG. 1.

The child's seat 1 is adjustable with regard to its inclination. For this purpose, an adjustable base plate 18 (FIG. 2) is provided on a bottom surface 17 of the seat area 4. The base plate 18 can be made of metal or plastic, for example. It can be arched upward in its center. The base plate 18 preferably has a somewhat square configuration. The form of the base plate 18 corresponds roughly to the seat area 4, but it is smaller than its bottom surface 17. The seat shell 2 is drawn down in the form of an encircling apron 19 on the sides outside of an area corresponding to the base plate 18, so that a box-like depression 20 is formed on the bottom surface 17 of the seat shell 2 to hold the base plate 18.

In the area of each of its rear corners viewed in the seat direction, the base plate 18 has peg-like shaft stubs 21 extending out to the sides. The apron 19 is provided at the points involved with two undercut slot-like recesses 22; into each of which a shaft stub 21 can be snapped with temporary broadening of the tapered slot opening 23, and can then pivot as a friction bearing. Since the two shaft stubs 21 and the recesses 22 provided for them in the apron 19 are all aligned with one another, the base plate 18 can be pivoted around this axis of rotation 24.

The particular pivot angle of the base plate 18 relative to the child's seat 1 is set by means of a mechanism positioned in the forward area of the seat bottom 17. There are multiple adjacent slot-like recesses 25, 26 aligned with one another located there on the side of the seat bottom 17 as friction bearings to hold a shaft 27 that runs perpendicular to the sitting direction. For the shaft 27 to be held in the slots 25, 26, the latter have arched slot interiors 28 in the form of a segment of a hollow cylinder surrounding the shaft 27 along an arc or more than 180°, following the same principle as the recesses 22 for the pivotable guidance of the shaft stubs 21.

The shaft 27 passes through the apron 19 at both ends and is provided there with control elements, for example in the form of handwheels 29. The shaft 27 carries two cams 30 inside the apron 19. These have the configuration of a disk with two identical faces 31 and a mantle surface 32. The circumference of the faces 31 follows an approximately spiral-shaped curve with a near-shaft or proximal area 33 and an area away from the shaft and radially widened or distal area 34.

There are depressions 35 above the two cams 30 in the seat bottom 17, into which the cams 30 are able to dip even with their radially widened areas 34. Since the recesses 25, 26 for the rotatable bearing support of the shaft 27 are located above the box-like depression 20, the base plate 18 can be pivoted completely into the box-like depression 20 when the cams 30 are pivoted away with their radially widened area 34 and into the depressions 35. The seat 1 stands on the encircling apron 19 and assumes an upright position relative to the vehicle's seat; cf. FIG. 3.

If the shaft 27 is then rotated manually with the handwheel 29, for example by 180°, then the radially extended areas 34 of the cams come out of the depressions 35 in the seat bottom 17 and press against the base plate 18. Since this rests on the vehicle seat, the front part of the seat surface 4 is instead raised from the shaft 27—the seat 1 then assumes a backward-inclined (relaxation) position; cf. FIG. 4.

For the particular seat position to be stable, depressions 37, preferably radial, can be provided in the outside of the handwheels 29, especially in their mantle faces 36, in which a projection 38 on the seat itself engages in a sitting position.

So that the base plate 18 does not swing away when the child's seat 1 is lifted off of a vehicle seat, its maximum pivoting motion is limited. A short belt 39, one end 40 of which is anchored to the base plate 18 in the area of its front edge, and that is fastened at 41 to the bottom of the seat 17 at the other end, serves this purpose. The second end of the belt 39 could also be designed like a loop and be wound around the shaft 27 in its middle section. The length of the belt 39 limits the pivot angle of the base plate 18.

Figures 3, 4:
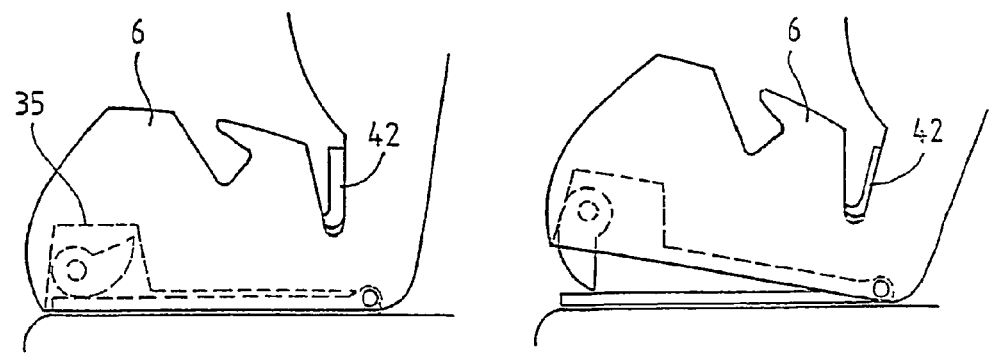
FIG. 3 a side view of FIG. 1 in upright seat position, partially broken away.
FIG. 4 an illustration corresponding to FIG. 3 after tilting the child's seat.

When the child's seat 1 is used for a small child and is firmly buckled to a vehicle seat in the upright position according to FIG. 3, the belt 10 is to be inserted in the depressions 14 and fastened in the tightened state to the clamping device 16 by its shoulder section. If the child's seat is then to be brought into the inclined position according to FIG. 4, then the seat surface 4 is pushed forward from the back rest of the vehicle by the back rest 5. However, such a motion would be prevented by the clamped-in vehicle belt 10 in the tightened state, because the waist section of the belt 10 cannot thereby be lengthened.

To assist, belt tighteners 42 are provided in the area of the depressions 14, which give the belt 10 a certain amount of slack when needed. For this purpose the rear depressions 14 on the inside 43 of their backs have surface areas 44 movable in the seat direction relative to the seat shell 2 between the arm rests 6 and the back rest 5, where the waist part of the vehicle belt 10 rests.

A first possibility for realizing the belt tighteners 42 and their elastically movable surface areas 44 is shown in FIG. 5. A somewhat rectangular element 45 can be seen on the back marginal inside face 43 of the slot-shaped depressions 14. This element 45 has an elongated outline with a somewhat vertical course, and it can be cemented or otherwise fixed in a recess 46 in the slot margin inside face 43 with about the same outline. The element 45 consists of an elastic material, for example rubber or a plastic with (limited) elasticity. If the elasticity of the material is too low, then additional cutouts can be provided in the rectangular element 45. These can be internal cavities 47 that are not visible from the outside. The cutouts or cavities 47 can have a variety of shapes, for example rectangular or prismatic with elongated or triangular or polygonal or round or oval outlines, or can be globular. If these cutouts or cavities 47 have a well-defined shape, a likewise define elasticity is obtained.

FIG. 6 shows another embodiment of a belt tightener 42'. In this case the movable surface are 44' is located on an element 45' of fixed shape. This likewise has an elongated outline with a rectangular shape, onto the bottom area of which can be formed a forward-projecting lug having a back surface 48, to grip beneath the vehicle belt 10 and keep it from getting out of line. The fixed-shape element 45' is partly held in a recess 46' in the slot margin face 43. Between the back surface of the lug 48 of the fixed-shape element 45' and the bottom 49 of the recess 46' there is/are one or more compression spring(s) 50 that try to push these two surfaces 48, 49 apart from one another. This presses the fixed-shape element 45' forward. So that it is not pushed completely out of the recess 46', a stop element 51 can be provided, for example a shaft 52 fastened to the seat shell 2 with a hook that grips in a cutout in the back surface 48 of the fixed-shape element 45' and grips around or behind an undercut located there. To hold the springs 50 in their positions, they can be mounted on pegs 53 that are fastened or formed on the lug back surface 48 of the fixed-shape element 45' or to the bottom 49 of the recess 46', or they can be held in depressions 54 located there and guided by them.

The invention claimed is:

1. A child car seat (1) comprising a seat surface (4), a back rest (5), side arm supports having side guides (12, 14) for insertion of a belt (10) of a car, at least one device (42; 42') for automatic belt tightening of the car belt (10), and a cam mechanism for adjusting inclination of the child car seat (1) relative to a vehicle seat of the car characterized by the fact that the device (42; 42') for belt tightening (10) is disposed in an area of the side guides (12, 14) and acts on shoulder and waist belts at the same time, and in that at least one clamp is provided in a top area of said back rest (5) for fastening the car shoulder belt (9) immovably relative to the child car seat (1) by clamping of the car shoulder belt (9), wherein the device (42, 42') for belt-tightening is provided with an element (44, 45; 44', 45') that is movable relative to at least one of the seat surface (4) and the back rest (5).

2. A child car seat (1) in accordance with claim 1, wherein the element (44, 45; 44', 45') of said belt-tightening device (42; 42') is elastic.

3. A child car seat (1) in accordance with claim 1, wherein the element (44, 45; 44', 45') of said belt-tightening device (42; 42') comprises an elastic material with a Shore hardness of between 30 and 80.

4. A child car seat (1) in accordance with claim 2, wherein the element (44, 45; 44', 45') of said belt-tightening device (42; 42') has cutouts in cavities that increase elasticity.

5. A child car seat (1) in accordance with claim 1, wherein said cam mechanism for adjusting the inclination of the child car seat (1) relative to the vehicle seat effects the adjustment without relative motion of said back rest (5) with respect to said seat surface (4).

6. A child car seat (1) according to claim 5, wherein said cam mechanism for adjusting the inclination of the child car seat (1) comprises a component (18) hinged to a selected one of a bottom and back (17) of the seat (1).

7. A child car seat (1) according to claim 6, wherein said component (18) hinged to the selected one of the bottom and the back (17) of the seat (1) can pivot around a shaft (21, 24) perpendicular to a seat direction and a seat direction of travel.

8. A child car seat (1) in accordance with claim 7 wherein said cam a mechanism is adapted for setting an angle of inclination of said component (18) relative to the seat bottom (17).

9. A child car seat (1) in accordance with claim 8 wherein said cam mechanism for setting the angle of inclination of pivotable component (18) is provided with at least one cam element (30) that is located in an area between the seat (1) and said pivotable component (18).

\* \* \* \* \*